United States Patent
Tada et al.

(10) Patent No.: US 9,499,777 B2
(45) Date of Patent: Nov. 22, 2016

(54) PROCESS FOR PRODUCING MALT-BASED DRINK FROM MALT FRACTIONED BY TISSUE

(75) Inventors: Nobuo Tada, Osaka (JP); Takako Inui, Ibaraki (JP); Norihiko Kageyama, Ibaraki (JP); Toshihiko Takatani, Osaka (JP); Yasutsugu Kawasaki, Yokohama (JP)

(73) Assignee: Suntory Holdings Limited, Osaka (JP)

( * ) Notice: Subject to any disclaimer, the term of this patent is extended or adjusted under 35 U.S.C. 154(b) by 575 days.

(21) Appl. No.: 10/558,770

(22) PCT Filed: May 28, 2004

(86) PCT No.: PCT/JP2004/007381
§ 371 (c)(1),
(2), (4) Date: Nov. 30, 2005

(87) PCT Pub. No.: WO2004/106483
PCT Pub. Date: Dec. 9, 2004

(65) Prior Publication Data
US 2006/0263483 A1 Nov. 23, 2006

(30) Foreign Application Priority Data
May 30, 2003 (JP) .................. 2003-155190

(51) Int. Cl.
*C12C 11/00* (2006.01)
*C12G 3/08* (2006.01)
*C12C 1/16* (2006.01)

(52) U.S. Cl.
CPC .. *C12G 3/08* (2013.01); *C12C 1/16* (2013.01)

(58) Field of Classification Search
CPC ....... A23L 2/56; A23L 1/30; A23L 1/22091; A23L 2/52; A23L 1/015; A23L 2/38; A23L 1/1016; A23L 1/185; A23L 1/22083; C12C 1/16; C12C 5/026; C12C 11/00; C12C 12/00; C12C 5/00
USPC ........... 426/592, 590, 534, 11, 16, 425, 618, 426/650
See application file for complete search history.

(56) References Cited

U.S. PATENT DOCUMENTS

| 3,745,018 A * | 7/1973 | Schuler ............. C12C 1/18 426/29 |
| 4,207,345 A * | 6/1980 | Van Gheluwe ...... C12C 7/01 426/11 |

FOREIGN PATENT DOCUMENTS

| DE | 2941698 A1 * | 4/1981 |
| EP | 0849356 A2 | 6/1998 |

(Continued)

OTHER PUBLICATIONS

Todorova, v, Kabakchieva, G., Ginova-Stoyanova, T. Obtaining and Applying Extracts of Malt Sprouts in the Production of Beer Wort, Khranitelna Promishlenost, 1988, 37 (4), pp. 17-18.*

*Primary Examiner* — Vera Stulii
(74) *Attorney, Agent, or Firm* — Ostrager Chong Flaherty & Broitman P.C.

(57) ABSTRACT

A process for producing malt-based beverage, in which any components, affecting flavor, foam quality, flavor stability and haze stability, of the malt-based beverage can be regulated by separating dried germinated barley as a raw material for malt-based beverage by tissues. In particular, the process for producing malt-based beverage comprises separating dried germinated barley into endosperm, endothelial layer, husk, acrospire, malt rootlets and unseparated part fractions and preparing a starting material of malt-based beverage from each or blend of the thus obtained by-tissue fractions, the each or blend optionally further mixed with wholegrain malt not subjected to fractioning, so that any components, affecting flavor, foam quality, flavor stability and haze stability, of the malt-based beverage can be regulated.

6 Claims, 1 Drawing Sheet

(56) References Cited

FOREIGN PATENT DOCUMENTS

| | | | |
|---|---|---|---|
| GB | 1202124 | | 8/1970 |
| GB | 2010326 A | * | 6/1979 |
| GB | 2294943 A | * | 5/1996 |
| JP | 56-068384 | | 6/1981 |
| JP | 63-028381 | | 2/1988 |
| JP | 63-032475 | | 2/1988 |
| JP | 63-068068 | | 3/1988 |
| JP | 2000004867 A | * | 1/2000 |
| JP | 02-117377 | | 2/2007 |
| SU | 1141111 A | * | 2/1985 |

* cited by examiner

PROCESS FOR PRODUCING MALT-BASED DRINK FROM MALT FRACTIONED BY TISSUE

The present application is an English language translation of International Application PCT No. PCT/JP2004/007381, filed May 28, 2004, which claims priority to Japanese Application No. JP 2003-155190, filed May 30, 2003; both applications are hereby incorporated by reference.

TECHNICAL FIELD

The present invention relates to a process for producing a malt-based beverage, the process comprising fractionating dry germinated barley which is a starting material for malt-based beverage—by tissue, and using singly or in combination two or more of these fractionated tissue fractions.

BACKGROUND ART

As malt-based beverages, beer, happoshu (low-malt beer beverage), whisky, low-alcohol fermented beverages, non-alcohol beverages, and the like are known. Among these beverages, beer, happoshu, and whisky are produced from wort derived from malt. Wort is produced from milled malt by a milling machine and converting the milled malt, optionally supplemented with a material other than malt such as corn into sugars (saccharification) in a mash kettle or in a mash tun. After saccharification, the wort is filtered, added with hops in the case of producing beer and happoshu, and boiled in a brew kettle. Then the mash is made to precipitate in a whirlpool, and cooled cold wort is subjected to fermentation. In production of whisky, the filtered wort is fermented with yeast and then subjected to distillation and maturation.

Low-alcohol fermented beverages may be produced by preparing wort or cold wort as is the same with production of beer and happoshu and terminating the fermentation at a low alcohol concentration (for example, alcohol concentration of less than 1%), or by providing a process of removing alcohols. Non-alcohol beverages also include malt-based beverages that are produced by adding flavoring components or sugars to wort as necessary without conducting fermentation.

For example, in producing beer, which is one kind of malt-based beverage, it is possible to produce a variety of malt-based beverages with different flavor, foam quality, flavor stability, and haze stability, by selecting different kinds of starting malt and materials other than malt or varying the mash condition in production of wort, yeast species for use, fermentation condition and the like. To present, malt-based beverages having various flavors have been provided.

Although quality of malt which is a starting material is determined by the cultivar and quality of barley and by the malting condition, the effect of changing the flavor presented by malt itself is limited because malt which is a starting material is generally milled by a milling machine and the resultant malt is directly saccharified or supplemented with a material other than malt such as corn before saccharification. In the current state of art, production of various malt-based beverages having different flavors relies on selections of materials other than malt. In order to change the flavor of a malt-based beverage further or improve the foam quality, flavor stability, and haze stability, it is necessary to control the malt ingredient which is a starting material more specifically.

As such measures, there are proposed wort from which deterioration precursors contained in husk are removed by separating malt into grains and husk, and washing the separated husk or soaking it in water or warm water before using it together with the grains, or a process for producing beer having increased flavor stability by removing polyphenols (Patent document 1, Patent document 2).

Also proposed are a process for producing wort or various methods of producing beer using, as a starting material, malt from which husk is removed in order to remove polyphenols or the materials which are believed to be deterioration precursors in production of beer (Patent document 3, Patent document 4, and Patent document 5).

[Patent document 1] Japanese Patent Publication No. Sho 62-47514
[Patent document 2] Japanese Patent Laid-Open Publication No. Hei 2-117377
[Patent document 3] Japanese Patent Publication No. Hei 4-39313
[Patent document 4] Japanese Patent Laid-Open Publication No. Sho 63-32475
[Patent document 5] Japanese Patent Laid-Open Publication No. Sho 63-68068

However, these methods are no more than solutions for the problems posed by husk of malt that is believed to adversely affect the production of beer, and they do not relate to the art that fractionates tissues of malt other than husk and examines the characteristics of each of the fractionated tissue fractions.

As to other malt-based beverages, none of them discuss fractionation of tissues of malt and characteristics possessed by the fractionated tissue fractions.

Dry germinated barley is composed histologically of a husk portion, an endothelial layer portion, an endosperm portion, an acrospire portion, and a malt rootlets portion, as shown in FIG. 1, and contents of components such as starch, protein, enzyme, and the like are known to differ among these tissue portions. Therefore, malt-based beverages of various different flavors can be obtained by fractionating these tissue portions, examining respective characteristics of the fractionated tissue portions, and blending and using the materials in combination as a starting material, however, nobody has attempted to accurately separate these tissue portions, and adjust the composition to prepare malt-based beverages.

Methods of widely adjusting components in beverage are now available such as significantly changing flavor of a malt-based beverage and dramatically improving foam quality, flavor stability, and haze stability, however, no such conventional methods have relied on a selection of a starting material to achieve such effects.

DISCLOSURE OF INVENTION

Problems to be Solved by the Invention

Under such a circumstance, it is an object of the present invention to provide a process for producing a malt-based beverage having variable flavor and excellent foam quality, flavor stability, and haze stability by separating and fractionating tissue portions of dry germinated barley which is a starting material of a malt-based beverage, examining characteristics thereof, and appropriately selecting the fractionated tissue portions based on the examination for use in combination as a starting material.

As shown in FIG. 1, dry germinated barley is known to be composed of several tissues. Focusing on these tissues of dry germinated barley, the present inventors noticed that fractions having componential characteristics are provided by separating the dry germinated barley by tissue. Based on this assumption, we expected that components derived from dry germinated barley in a malt-based beverage may be controlled by adding or reducing blending amounts of these fractions and unfractionated whole-grain malt or malt rootlets.

The present inventors then fractionated dry germinated barley industrially and strictly by tissue, and minutely examined how the obtained fractions influenced flavor, foam quality and the like in production of malt-based beverages, rather than simply analyzing components of a particular fraction. As a result, we demonstrated that componentially characteristic fractions may be obtained by separating dry germinated barley into fractions by tissue as shown in FIG. 1. We also demonstrated that by actually adjusting combination of fractions for a starting material of malt-based beverage, components in a malt-based beverage such as amino acid, lipid, lipoxygenase, polyphenol, total nitrogen amount, an astringent substance, and the like components are controlled. As a result of the controlling components, various malt fermented beverages with controlled flavor, foam quality, flavor stability, and haze stability can be produced and finally accomplished by the present invention.

Means for Solving the Problem

Therefore, basic aspects of the present invention are following production methods of malt-based beverage.
(1) A process for producing a malt-based beverage, the process comprising controlling a component derived from dry germinated barley contained in the malt-based beverage;
(2) The process for producing a malt-based beverage according to (1), wherein the controlling of a component includes fractionating dry germinated barley by tissue, and using the fractionated fractions at any ratio;
(3) The process for producing a malt-based beverage according to (2), wherein the fractionating by tissue provides an endosperm fraction, an endothelial layer fraction, a husk fraction, an acrospire fraction, a malt rootlets fraction, or an unseparated fraction thereof, and the fractions that are fractionated by tissue are used singly or in combination of plural fractions as a starting material for the malt-based beverage;
(4) The process for producing a malt-based beverage according to (3), wherein as a starting material for the malt-based beverage, up to 100% by weight of endosperm fraction, up to 90% by weight of endothelial layer fraction, up to 50% by weight of husk fraction, up to 30% by weight of acrospire fraction, or up to 30% by weight of malt rootlets fraction is used singly or in combination of plural fractions in the starting material excluding water and hops;
(5) The process for producing a malt-based beverage according to (3), wherein as a starting material for the malt-based beverage, 20 to 100% by weight of endosperm fraction in the starting material excluding water and hops is used;
(6) The process for producing a malt-based beverage according to (3), wherein as a starting material for the malt-based beverage, 10 to 70% by weight of endothelial layer fraction in the starting material excluding water and hops is used;
(7) The process for producing a malt-based beverage according to (3), wherein as a starting material for the malt-based beverage, 2 to 30% by weight of acrospire fraction in the starting material excluding water and hops is used;
(8) The process for producing a malt-based beverage according to (3), wherein as a starting material for the malt-based beverage, 0.1 to 30% by weight of malt rootlets fraction in the starting material excluding water and hops is used;
(9) The process for producing a malt-based beverage according to (3), wherein as a starting material for the malt-based beverage, 0.01 to 50% by weight of husk fraction in the starting material excluding water and hops is used;
(10) The process for producing a malt-based beverage according to (3), wherein as a starting material for the malt-based beverage, 10 to 60% by weight of endothelial layer fraction in the starting material excluding water and hops is contained, and a total of endosperm fraction, materials other than malt, and whole-grain malt is in a range of 40 to 90% by weight;
(11) The process for producing a malt-based beverage according to (3), wherein as a starting material for the malt-based beverage, 50 to 100% by weight of endosperm fraction in the starting material excluding water and hops is contained, and a total of materials other than malt and whole-grain malt is in a range of 0 to 50% by weight;
(12) The process for producing a malt-based beverage according to (3), wherein an unseparated fraction is not substantially included;
(13) The process for producing a malt-based beverage according to (12), wherein as a starting material for the malt-based beverage, 100% by weight of endosperm fraction in the starting material excluding water and hops is contained;
(14) The process for producing a malt-based beverage according to (1) to (13), wherein amino acid, lipid, lipoxygenase, polyphenol, total nitrogen amount, or an astringent substance is adjusted;
(15) The process for producing a malt-based beverage according to (1) to (13), wherein either flavor, flavor stability, foam quality, or haze stability is improved.

As other basic aspects, the present invention provides:
(16) A malt-based beverage produced by the process according (1) to (15);
(17) The malt-based beverage according to (16), wherein the malt-based beverage is beer, happoshu (low-malt beer beverage), whisky, a low-alcohol fermented beverage, or a non-alcohol beverage.

As another basic aspect, the present invention provides:
(18) A process for selecting a starting material for a malt-based beverage, the process comprising in a process for producing a malt-based beverage: fractionating dry germinated barley serving as a starting material into an endosperm fraction, an endothelial layer fraction, a husk fraction, an acrospire fraction, and a malt rootlets fraction; and combining and blending the fractions that are fractionated by tissue singly or in a combination of plural fractions in designing flavor of the malt-based beverage;
(19) The selection process according to (18) for obtaining a malt-based beverage in which either flavor, flavor stability, or foam quality is improved, or amino acid and various active ingredients are enhanced.

Effect of the Invention

With the process for selecting a starting material provided by the present invention, it is possible to produce a malt-based beverage in which either flavor, flavor stability, or foam quality is improved, or amino acid and various active ingredients are enhanced. That is, it is possible to produce a malt-based beverage having flavor stability and haze stability as well as having various flavors and excellent foam quality.

In particular, since different tissue fractions of fractionated dry germinated barley can be used in appropriate combination as a starting material for malt-based beverage, it is possible to provide malt-based beverages with different tastes according to preferences of particular consumers. Examples of such flavors include light flavor, bodied flavor, astringent flavor, roasted flavor, and the like.

BEST MODE FOR CARRYING OUT THE INVENTION

In the following, the present invention will be described in detail while explaining means for separating dry germinated barley into different tissue portions and characteristics of each separated tissue fraction.

A malt-based beverage provided by the present invention involves alcohol beverages (including distilled beverages) and non-alcohol beverages that are produced by using malt as a part or whole of their starting material. Concrete examples include beer, happoshu (low-malt beer beverage), whisky, low-alcohol malt-based beverages (e.g., malt-based beverages containing less than 1% of alcohols), and non-alcohol beverages.

As to a malt-based beverage provided in the present invention, the step of obtaining malt which is to be a starting material includes steeping barley in water to cause germination, and kilning. Therefore, the term dry germinated barley used herein refers to barley that is dried after germination.

Dry germinated barley is histologically composed of various tissues. In the present invention, dry germinated barley is fractionated by tissue, and the obtained tissue fractions are used as a starting material for a malt-based beverage. In fractionation of dry germinated barley by tissue, it is important to fractionate into tissue units each having properties giving characteristics to quality of the resultant beverage. For ease of fractionation, the tissue units may be appropriately selected.

Considering the ease of fractionation in industrial scale, and characteristics given to flavor, quality and the like of malt-based beverage, fractionation preferably provides five fractions, i.e., a malt rootlets fraction, a husk fraction, an endosperm fraction, an endothelial layer fraction, and an acrospire fraction, for example, as shown in FIG. 1 in the case of fractionating dry germinated barley by tissue.

Each fraction may be fractionated, concretely in the manner as described below. Whether the fractionation provides fractions for intended tissues may be confirmed by observing appearance of the obtained fraction, by microscopic observation, or by componential analysis.

Malt Rootlets Fraction:

Dry germinated barley is composed of whole-grain malt (hereinafter, referred to simply as malt) and malt rootlets. By separating dry germinated barley charged in a deculmer into malt and malt rootlets, it is possible to obtain a malt rootlets fraction. As the deculmer, a rotary slit drum (manufactured by Meiji-Machine Co., Ltd.), for example, can be used.

Endosperm Fraction:

In general, the process of polishing the superficial layer of grain and separating husks and the like from endosperm is called "grinding." By grinding the malt obtained by separation from the malt rootlets using a grinder, it is possible to divide the malt into an endosperm fraction corresponding to a nucleus part, and so-called bran corresponding to a surrounding part. Yield of the grinding may be appropriately adjusted allowing for the quality of provided malt so as to properly conduct the separation into the endosperm fraction and the bran. In the present invention, the yield of grinding is preferably in the range of 50 to 95%, with the range of 75 to 85% being particularly preferred.

Endothelial Layer Fraction:

The term "endothelial layer fraction" used herein refers to a pass-through fraction of the above bran that has passed through a sieve. The mesh of sieve may be appropriately selected for optimum separation depending on the quality and the like of the bran, and those having an aperture of 600 to 850 μm, in particular about 710 μm are preferably used. The endothelial layer fraction thus obtained histologically includes tissues called pericarp and testa, and an aleurone layer. However, it was found that further separation is accompanied by industrial difficulty, and peculiar characteristic of the endothelial layer fraction may be realized without conducting further fractionation. Accordingly, in the present invention, it is not necessary to further fractionate the endothelial layer fraction into more particular tissue fractions, and the endothelial layer fraction obtained above may be used as it is.

Husk Fraction and Acrospire Fraction:

By aspirating the residual fraction on the sieve left as a result of sieving of the bran, the fraction can be separated into a low-gravity section and a high-gravity section. The part obtained as a low-gravity section is a husk fraction and the part obtained as a high-gravity section is an acrospire fraction. The condition of this aspirator operation may be appropriately set so as to allow separation between the husk fraction and the acrospire fraction.

The tissue fractions obtained in the manner as described above may contain other tissues and unseparated fractions as far as their characteristics are not hindered.

The term "unseparated fraction" used herein means fractions in which two to four fractions among the above five fractions by tissue are unseparated. In the present invention, however, whole-grain malt is not referred to as an unseparated fraction. For example, when it is preferred to use both the husk fraction and the acrospire fraction as a starting material for malt-based beverage, both the fractions may be used, and an appropriate amount of unseparated fraction may be used with respect to each of these fractions.

With the fractionating method as described above, it is possible to fractionate the dry germinated barley which is to be a starting material for malt-based beverage by tissue. Our examination revealed that each fraction thus fractionated by tissue has the characteristics as shown below and provides a respective specific flavor when used as a starting material for a malt-based beverage.

The malt rootlets fraction is typically contained in dry germinated barley in an amount of about 2 to 3% by weight. The contents of protein component and amino acid were high, and in particular, the content of astringent substance was significantly high. The contents of starch and polyphenol were relatively low. Therefore, generally, a malt-based beverage with light flavor can be realized without using this fraction as a starting material of the malt-based beverages because of its high content of astringent substance. When the malt rootlets fraction is used for the purpose of imparting bodily characteristic, it may be used in a proportion of 0.1 to 30% by weight in a starting material excluding water and hops. If the proportion is more than 30% by weight, astringent taste stands out, so that it is no longer suited for drink. Additionally, because of the high content of amino acid which adversely affects the foam quality, the foam quality of the resultant malt-based beverage is improved by reducing the use of the malt rootlets fraction as a starting material. However, malt rootlets contain useful active substances such as muscarinic M3 receptor agonists that are potential stimulators of gastrointestinal motility. Therefore, when the using amount of malt rootlets is large, it is preferred to use malt rootlets with reduced unpleasant flavors such as astringent taste as a starting material, for example by using malt rootlets with controlled grain size.

We also demonstrated that by adding the malt rootlets fraction in a proportion ranging from 2 to 30% by weight in a starting material excluding water and hops for the purpose of supplying nutrition sources, the fermentation is promoted. This is suitable for the case where nutrition sources for yeast such as amino acid is short during fermentation, as is the case of happoshu in which the proportion of used malt is low.

The endosperm fraction is mainly formed of endosperm. This fraction typically makes up approximately 80% of malt. It was found that this fraction is rich in starch but has relatively small contents of protein components, amino acid, polyphenol, fatty acid, and astringent substance. Therefore, when a malt-based beverage is produced using this fraction as a starting material, it is possible to produce a malt-based beverage exhibiting light flavor and having improved foam quality and flavor stability. In the light of these features, the endosperm fraction may be used as a starting material for malt-based beverage in a proportion of up to 100% by weight in a starting material excluding water and hops. This fraction contains various enzymes necessary to produce wort sufficiently.

The endothelial layer fraction is histologically composed of mainly pericarp and testa, and aleurone layer as main tissues. This fraction typically makes up approximately 13% of malt. In this fraction, the contents of protein component, amino acid, polyphenol, fatty acid, and astringent substance were high, while the content of starch was relatively low. Therefore, this fraction may be used as a starting material for the purpose of imparting flavors to a malt-based beverage because of its abundant taste components such as protein component and polyphenol. For example, in production of light beer or diet beer of low calories, it may be used in a proportion up to 90% by weight in a starting material excluding water and hops for the purpose of imparting flavors. Also this fraction contains various enzymes necessary to produce wort sufficiently.

However, when the content of the endothelial layer fraction as a starting material is high, a measure to remove the astringent taste is necessary, whereas when the content of the endothelial layer fraction is low, characteristics of the endothelial layer fraction are not exhibited. Therefore, it is particularly preferred to use the endothelial layer fraction in a proportion ranging from 10 to 70% by weight in a starting material excluding water and hops. In general, lighter flavor than that of usual beer is realized by not using the endothelial layer fraction or using it in an amount of not more than 13%.

For the purpose of imparting flavors to a malt-based beverage, the endothelial layer fraction may be used in a proportion of not more than 30% by weight in a starting material excluding water and hops. Use of larger amount will make the astringent taste stand out in the malt-based beverage.

We also found that the endothelial layer fraction has a high content of lipid that may cause stale flavor when oxidized and high lipoxygenase activity. Also, the content of amino acid which may cause stale flavor when heated and oxidized was high. Therefore, the lower the use ratio of the endothelial layer fraction as a starting material, the better the flavor stability of the malt-based beverage becomes. In addition, since the contents of lipid and amino acid that adversely affect the foam quality are large, the lower the use ratio of the endothelial layer fraction as a starting material, the better the foam stability of the malt-based beverage becomes. In view of the above, the lower the use ratio of the endothelial layer fraction as a starting material is, the more desirable the flavor stability and foam quality of the malt-based beverage will be. When the proportion of the endothelial layer fraction is raised, the adverse effect on the flavor stability and foam quality can be mitigated to some extent by reducing the use amount of the starting material. Since the endothelial layer fraction is rich in Maillard reactants, in order to enhance the color tone of the malt-based beverage, the proportion of the endothelial layer fraction used as a starting material may be increased to some extent.

In the case where sources of nutrition for yeast such as amino acid are short during fermentation, as is the case of happoshu in which the proportion of malt used is low, it is possible to promote the fermentation by adding the endothelial layer fraction as a starting material in a proportion ranging from 0 to 25% by weight in a starting material excluding water and hops for the purpose of supplying a source of nutrition.

The husk fraction is mainly composed of husk covering the grain, and is rich in fibers. This fraction typically makes up approximately 8% of malt. Addition of this fraction during a mashing process will improve the filtration efficiency because filtration speed of wort is improved. For this purpose, the husk fraction may be used in a proportion of up to 50% by weight in a starting material excluding water and hops. The husk fraction having experienced high temperature and high pressure treatment can impart roasted flavor to a malt fermented beverage, and in such a case, the husk fraction may be used in an amount of up to 20% by weight as a starting material.

The acrospire fraction is mainly composed of acrospire, and typically makes up approximately 2% of malt. Like the malt rootlets fraction, the acrospire fraction had a significantly high content of astringent substances, and was rich in protein component and amino acid. For this reason, in order to provide a malt-based beverage with body, the acrospire fraction may be used in a proportion up to 30% by weight in the starting material excluding water and hops. In order to reflect the characteristic of this fraction in a beverage, it is preferred to add in a proportion higher than that in the whole-grain malt (approximately 2%). If the use amount exceeds 30% by weight, astringent taste becomes outstanding, so that it is no longer suitable for drink. It was also found was that the acrospire fraction not only has a high content of amino acid which will cause stale flavor when degraded and oxidized, but also has a high content of lipid which will cause stale flavor when oxidized as is the same with the endothelial layer fraction, and has high lipoxygenase activity. Therefore, as is the case with the endothelial layer fraction, the lower the use proportion of the acrospire fraction as a starting material is, the better the flavor stability of the resultant malt-based beverage becomes. As is the case with the malt rootlets fraction and the endothelial layer fraction, in happoshu in which use ratio of malt is low, it is possible to promote the fermentation by adding the acrospire fraction in a proportion of up to 25% by weight in a starting material excluding water and hops for the purpose of supplying a source of nutrition for yeast such as amino acid.

By appropriately selecting and blending the tissue fractions described above to use them as a starting material for malt-based beverage, it is possible to control the flavor, foam quality, flavor stability, and haze stability in a variety of kinds of malt-based beverages. Therefore, the present invention also provides a process for selecting a starting material for controlling the flavor, foam quality, flavor stability, and haze stability of an intended malt-based beverage in production of malt-based beverage.

In the malt-based beverages provided by the present invention, control of components derived from malt may be achieved in the manner as describe above. However, further component adjustment is allowed by using materials other than malt such as sugars and barley together. Various enzymes such as diastatic enzyme may also be added as necessary. Materials having previously saccharified such as saccharified starch may be combined. Further, by setting conditions for milling, saccharifying, wort clarification, boiling, and fermentation in accordance with the material whose components are adjusted as described above, finer adjustment is possible.

EXAMPLES

The present invention will now be described in more detail by way of examples. It is to be noted that the present invention is not limited to these examples.
[Test Method]

Test items and test methods used in the present examples will be described below. The test method in the present example was conducted based on this description unless otherwise specified.
Test Items:

Extraction concentration, original extract, total polyphenols, free amino nitrogen, total nitrogen, foam stability, .OH lagtime, sensory evaluation, and astringent substance.
Test Methods:
(a) An extract concentration was determined by SCABA method [modified BCOJ beer analysis method (1998) 8.1.3SCABA method].
(b) "Original extract" measured in a fermented product is an extract concentration of wort before fermentation calculated from a proportion of solids in the fermented product (real extract) and alcohol. As a method for determination, SCABA method [modified BCOJ beer analysis method (1998)8.1.3SCABA method] was used.
(c) A total polyphenol amount was determined by a colorimetric method [modified BCOJ beer analysis method (1998)8.19 total polyphenol] based on a reaction between trivalent iron ion and polyphenol
(d) Amino nitrogen was measured by TNBS method [Methods of Analysis of the ASBC (1987), Method Beer-31].
(e) A total nitrogen amount was determined by Kjeldahl method [modified BCOJ beer analysis method (1998) 4.3.5 soluble total nitrogen].
(f) For evaluating the foam quality, foam stability serving as an index for foam quality was determined in the following manner. To a 2 L-measuring cylinder, 633 mL of beer was poured over 30 seconds, and an area ($cm^2$) adhered to the surface of the glass was measured after 30 minutes.
(g) As to a .OH lag time, change in quantity of free radical was measured using an electron spin resonance apparatus (called ESR or EPR apparatus) and a time until free radicals increase was evaluated as a .OH lag time.

This .OH lag time was used as an index for flavor stability of a malt-based beverage [J. Am. Soc. Brew. Chem., 1996, 54(4), 198-204 and, J. Am. Soc. Brew. Chem., 1996, 54(4), 205-211].
(h) Sensory evaluation:

Three to ten well-trained panelists had a sample in an odor-free sensory room and the results were evaluated. Evaluation was made while designating the best point as 3, and the worst point as 0 unless otherwise specified.
(i) astringent substance:

An amount of an astringent substance was measured in the following manner.

Taking a component for which astringent taste is observed in the sensory evaluation as an objective component, high-performance liquid chromatography (HPLC) was conducted. In brief, an objective component was generally separated by a primary HPLC, a fraction containing the objective component was subjected to heart-cut through column switching and shifted to a secondary column, and a fraction containing the objective component was separated again in the secondary HPLC.

The HPLC conditions were as follows.

Both in the primary and the secondary HPLC, a precondensing column [PVA (4 mm×30 mm), SCR-RP3, #228-33713-91, SHIMADZU] was used. As to the columns, a primary separation column [Develosil C30-UG-5, Nomura Chemical Co., Ltd.], and a secondary separation column [C18ODS (4.6 mm×15 cm, 3.5 μm)×3 columns, symmetry, #200630, Waters Corporation] were used. The column temperature was set at 25° C. As a mobile phase, a primary mobile phase (A solution: 0.05% TFA aqueous solution, B solution: 0.05% TFA/50% MeOH), and a secondary mobile phase (A solution: 0.05% TFA aqueous solution, D solution: 0.05% TFA/70% MeOH) were used.

The following gradient change was adopted: B solution: 0% (0 min.) –20% (25 min.) –80% (40 min.) –0% (50 min.); C solution: 20% (0 min.) –20% (37 min.) –60% (70 min.) –0% (70 min.) –0% (50 min.). As a sample to be applied, about 5 mL of beer or wort was filtered through a 0.45 μL syringe filter, and then 2000 μL of the sample was applied. The time for column switching was 1.5 min. 1000 μL of the processed sample was applied and a fraction eluted from 34 min. to 35 min. in the primary separation was subjected to heart-cut, and introduced to the secondary separation. As a detector, a fluorescence detector was used.

The components separated in the above analytical method were added to beer that was separately prepared and subjected to sensory evaluation, to reveal that the astringent taste increases depending on the adding amount.

EXAMPLE 1

Process for Fractionating Tissue Fractions of Dry Germinated Barley

From dry germinated barley that was produced by soaking barley in water to make it germinate, and drying, malt rootlets were separated from malt by means of a deculmer (Meiji-Kikai). The malt rootlets weighed about 2.4% (w/w) of the dry germinated barley.

Then malt rootlets-free malt was fractionated in the following manner.

In accordance with the flow shown in FIG. 2, about 500 kg of malt was grinded by a grinding machine (RMDB40A SATAKE Corporation) to 80% yield, and then separated into a grain-grinded fraction (endosperm fraction) and bran. The operation condition at this time was rotation speed of 340 rpm, current value of 32 A and screen network of 10 mesh for yield of 100 to 90%, and rotation speed of 320 rpm, current value of 30 A and screen network of 11 mesh for yield of 90 to 80%.

The bran was collected with a dust collector, and separated into an endothelial layer fraction for bran of not more than 710 μm and bran of not less than 710 μm through a sifter having an aperture of 710 μm. Furthermore, the bran of not less than 710 μm was separated into a high-gravity section (acrospire fraction) and a low-gravity section (husk fraction) through wind selection by a multi-aspirator.

The weight ratio of these fractions, endosperm fraction:endothelial layer fraction:acrospire fraction:husk fraction was 80:13:2:5.

EXAMPLE 2

Evaluation of Wort Using Tissue Fraction

In order to examine the effect on product quality more thoroughly than evaluating components and flavors of fractions simply by extracts, we experimentally produced wort from tissue fractions, and evaluated for components and flavors.

As for the whole-grain malt, the endosperm fraction, and the endothelial layer fraction, a saccharification solution was produced from 40 g of fraction and 240 mL of brewing water in accordance with a conventional method, and centrifuged, to give wort. As for the acrospire fraction, the malt rootlets fraction, and the husk fraction which have water-absorbing property originating from their tissues, and hence unsuitable for production of wort alone, the wort was produced in a similar manner except that each fraction was added to the whole-grain malt so as to be 10%. The analyzed values are shown in Table 1, and the sensory evaluation is shown in Table 2.

Comparing the wort of each fraction with the wort of the whole-grain malt, the results in the tables show that the endosperm fraction had a high extract concentration but low contents of amino acids and protein component. Since amino acids adversely affect the foam quality of a malt-based beverage, we expected that the foam quality would be improved by using the endosperm fraction. Further, this fraction contained little polyphenol and astringent substance, and exhibited light sweetness in the sensory evaluation. Therefore, we expected that a malt-based beverage having light after taste without astringent taste can be produced by using the endosperm fraction.

Contrarily to the endosperm fraction, the endothelial layer fraction had a low extract concentration and was rich in amino acids, protein component, and polyphenol. Use of this fraction may deteriorate the foam quality of a malt-based beverage due to high amino acid content, however, we expected that deterioration of foam quality can be prevented by using adjuncts together as for the happoshu having a low malt content. Additionally, since amino acids will be a nutrition source for yeast in fermentation, we expected that this fraction may improve the activity of yeast when it is used for happoshu having a low malt content. Additionally, since the fraction is abundant in polyphenol and protein component which are taste components, we expected that use of this fraction as a starting material can impart flavor to a malt-based beverage.

As to "whole-grain malt+acrospire fraction" and "whole-grain malt+malt rootlets fraction," they had a low polyphenol content and high contents of amino acid, protein component, and astringent substance. This demonstrates that the acrospire fraction and the malt rootlets fraction may possibly improve the activity of yeast the same as the endothelial layer fraction.

As to the "whole-grain malt+husk fraction," strong water absorbability was observed from high moisture content of wort residue after centrifugation. Components in the wort

TABLE 1

|  | Whole-grain malt | Endosperm fraction | Endothelial layer fraction | Whole-grain malt + acrospire fraction | Whole-grain malt + malt rootlets | Whole-grain malt + husk fraction |
| --- | --- | --- | --- | --- | --- | --- |
| Extract concentration (%) | 11.2 | 11.8 | 9.1 | 10.9 | 10.6 | 10.7 |
| pH | 5.86 | 5.83 | 5.82 | 5.84 | 5.96 | 5.85 |
| Total polyphenols (ppm) | 78.9 | 73.4 | 134.0 | 62.3 | 52.5 | 76.2 |
| Free amino nitrogen (mg/100 mL) | 17.1 | 16.0 | 27.0 | 21.8 | 23.8 | 16.4 |
| Total nitrogen (mg/100 mL) | 89.5 | 83.7 | 129.5 | 110.0 | 110.0 | 85.0 |
| Astringent substance (ppm) | 6.81 | 5.83 | 12.07 | 12.50 | 10.92 | 6.90 |

TABLE 2

|  | Whole-grain malt | Endosperm fraction | Endothelial layer fraction | Whole-grain malt + acrospire fraction | Whole-grain malt + malt rootlets | Whole-grain malt + husk fraction |
| --- | --- | --- | --- | --- | --- | --- |
| Sweetness | 2.3 | 2.5 | 1.3 | 1.2 | 1.5 | 2.0 |
| Astringent Taste | 1.4 | 0.6 | 2.5 | 2.8 | 2.7 | 1.6 | were almost as same as those in the whole-grain malt. Also in the sensory evaluation, flavors almost the same with those of the whole-grain malt were exhibited, and we expected that no affect effect was exerted on the sweetness and astringent taste.

EXAMPLE 3

Experimental Production of Beer 1 (Use of Endosperm Fraction 1)

Based on the fact that endosperm fraction is poor in astringent substance, we produced beer using only an endosperm fraction as a starting material for the purpose of producing beer with light flavor. We also examined whether the endosperm fraction with no husks can be filtered through a mash filter because filtration of wort cannot be conducted through a lauter tun using husks as a filtration layer.

Using the endosperm fraction fractionated in the process of Example 1, beer was produced in 100 L scale. The endosperm fraction was finely milled with a hummer mill, and 9 kg of the milled material and 36 L of brewing water were put in a mash kettle, and 21 kg of milled material and 84 L of brewing water were put in a mash tun, and a saccharification solution was produced in a routine manner. This was then put into a mash filter for filtration, and the obtained wort was added with hops, and then boiled. Then the wort was transferred to a settling tank to separate and remove the sediments, and then cooled to about 12° C. After adjusting the extract concentration of this cold wort to 11.3% by addition of water, the resultant wort was introduced into a fermentation tank, inoculated with beer yeast, and allowed to ferment, to give beer (Prototype 3). For reference, as for the whole-grain malt, beer was produced in the same manner (Reference product 3).

Prototype 3 could be filtered through the mash filter without any trouble as is the case of Reference product 3, to give clear wort, and beer was desirably produced.

As shown in Table 3 below, Prototype 3 had a low amino acid content and greatly improved foam stability. Also it was found that a .OH lag time was long, and flavor stability was excellent.

In the sensory evaluation, Prototype 3 was weaker in cereal smell, slightly lighter, and had less astringent taste compared to Reference product 3.

Also beer forcibly deteriorated at 37° C. for one week was subjected to sensory evaluation, to reveal that the degree of deterioration was lower in Prototype 3 than in Reference product 3 as shown in Table 4 below. In this manner, by reducing the endothelial layer fraction and the acrospire fraction having high lipoxygenase and rich in amino acids, it was possible to confirm the improvement in the flavor stability.

TABLE 3

|  | Prototype 3 | Reference product 3 |
| --- | --- | --- |
| Original extract (w/w %) | 11.49 | 11.27 |
| Total nitrogen (mg/100 mL) | 93.2 | 107.9 |
| Free amino nitrogen (mg/100 mL) | 17.0 | 20.1 |
| Total polyphenols (ppm) | 110 | 154 |

TABLE 3-continued

|  | Prototype 3 | Reference product 3 |
| --- | --- | --- |
| Foam stability (cm$^2$) | 180 | 128 |
| .OH lag time (min.) | 104 | 75 |
| Astringent substance (ppm) | 5.1 | 7.8 |

TABLE 4

|  | Prototype 3 | Reference product 3 |
| --- | --- | --- |
| Total score poor(1)-good(3) | 1.5 | 2.0 |
| Character | Oxidized odor Papery odor | Oxidized odor Cardboard odor |

These results demonstrate that beer can be produced using a mash filter even when only the endosperm fraction is used as a starting material. Also we confirmed that the endosperm fraction is useful for production of beer that is characterized by light flavor with no harsh taste. We also confirmed that the endosperm fraction is useful for production of beer having excellent foam quality and flavor stability.

EXAMPLE 4

Experimental Production of Beer 2 (use of Endosperm Fraction 2)

When only the endosperm fraction is used as a starting material, wort filtration by means of a lauter tun is impossible because of absence of husks. In order to confirm whether clarification of wort by means of a lauter tun is possible by blending whole-grain malt, we produced beer using a 1:1 mixture of endosperm fraction and whole-grain malt as a starting material. We also examined whether characteristics of flavor, foam quality, and flavor stability of endosperm fraction of Example 3 appear in the case where whole-grain malt is blended in the endosperm fraction.

Using the whole-grain malt, the endosperm fraction, and the whole-grain malt fractionated in the process of Example 1, we produced beer in 100 L scale. 17.5 kg of whole-grain malt and 17.5 kg of the endosperm fraction were milled in a roll mill, and a total of 35 kg of the milled material and 140 L of brewing water were charged in a mash tun, and a saccharified solution was produced in accordance with a conventional method. This saccharified solution was then filtered through a lauter tun. Boiling and fermentation were followed in the same manner as in Example 3, to produce beer (Prototype 4). For reference, beer was produced from the whole-grain malt in the same manner (Reference product 4).

The result demonstrated that the filterability of wort of Prototype 4 was almost the same as that of Reference product 4, and when a 1:1 mixture of endosperm fraction and whole-grain malt was used as a starting material, filtration through a lauter tun could be conducted without any trouble. Independently of this, a 2:1 mixture of endosperm fraction and whole-grain malt was evaluated, to reveal that a long time was required although clear wort was obtained. These results suggest that it is preferred to set the proportion of the endosperm fraction at 67% or less and the proportion of the whole-grain malt at 33% or more when they are filtered through a lauter tun.

Prototype 4 contained less protein component, amino acid, polyphenol, and astringent substance and had improved foam quality than Reference product 4, and exhibited the characteristics of the endosperm fraction confirmed in Example 1. The results are shown in Table 5 below.

In the sensory evaluation, light flavor characteristic with little astringent taste was confirmed although the difference was smaller than that between Reference product 3 and Prototype 3 in Example 3.

These results show that characteristics of endosperm fraction appear even if the endosperm fraction is partially blended in a starting material.

These results are summarized in the Table below.

TABLE 5

|  | Prototype 4 | Reference product 4 |
| --- | --- | --- |
| Original extract (w/w %) | 11.35 | 11.33 |
| Total nitrogen (mg/100 mL) | 69.3 | 77.1 |
| Free amino nitrogen (mg/100 mL) | 12.9 | 14.6 |
| Total polyphenols (ppm) | 165 | 181 |
| Foam stability (cm$^2$) | 170 | 105 |
| Astringentsubstance (ppm) | 7.1 | 8.5 |

EXAMPLE 5

Experimental Production of Beer 3 (Use of Endothelial Layer Fraction)

The results of Example 2 showed that the endothelial layer fraction is rich in protein component and polyphenol which are taste components, and when it is used as a starting material, it imparts flavor to the resultant beverage. In order to confirm this effect, we produced beer using both the endosperm fraction and the endothelial layer fraction, and evaluated the quality.

Using the endosperm fraction and the endothelial layer fraction fractionated in the process of Example 1, we produced beer in 100 L scale. The endosperm fraction was milled by a hammer mill, and 33 kg of the milled material and 132 L of brewing water were charged in a mash tun, and a saccharified solution was produced in accordance with a conventional method. The solution was then filtered through a mash filter, and the obtained wort was boiled after adding hops. Then the wort was transferred to a settling tank, and after separation and removal of the sediments, the wort was cooled to about 12° C. to give cold wort. 15 kg of endothelial layer fraction not having experienced milling and 60 L of brewing water were charged in the mash tun, and cold wort was produced in the manner similar to that for the endosperm fraction. These two cold wort thus obtained were put together, and the extract concentration was adjusted to 8.0% by adding water. Then it was introduced into a fermentation tank, inoculated with beer yeast, and allowed to ferment, to produce beer (Prototype 5). For reference, beer was produced from the endosperm fraction in the same manner (Reference product 5).

These result showed that Prototype 5 had higher contents of protein component, amino acid, polyphenol, and astringent substance compared to Reference product 5, and rich in taste component. The deterioration in foam quality is attributable to a higher amino acid content in the endothelial layer fraction than that in the endosperm fraction. Furthermore, the short .OH lag time may imply deterioration of flavor stability.

In the sensory evaluation, we felt that Prototype 5 had better taste.

From these results, we confirmed that use of the endothelial layer fraction as a starting material is useful for imparting taste although it deteriorates the foam quality and flavor stability.

These results are summarized in Table 6 below.

TABLE 6

|  | Prototype 5 | Reference product 5 |
| --- | --- | --- |
| Original extract (w/w %) | 8.19 | 8.19 |
| Total nitrogen (mg/100 mL) | 84.0 | 68.1 |
| Free amino nitrogen (mg/100 mL) | 19.1 | 14.9 |
| Total polyphenols (ppm) | 168 | 113 |
| Foam stability (cm$^2$) | 52 | 65 |
| Astringent substance (ppm) | 8.9 | 6.2 |
| .OH lag time (min.) | 74 | 84 |
| Taste (0-3) | 1.2 | 0.9 |

EXAMPLE 6

Experimental Production of Happoshu 1 (Use of Endothelial Layer Fraction)

Since the endothelial layer fraction is rich in nutrition sources for yeast such as amino acid, we examined whether the fermentation speed changes when the endothelial layer fraction is used as a starting material in a malt-based beverage in which use ratio of malt is low.

Using the endothelial layer fraction and the whole-grain malt fraction fractionated in the manner as in Example 1, and saccharified starch as starting materials, happoshu was produced in 100 L scale. A mash tun was charged with 8.6 kg of the endothelial layer fraction and 3.7 kg of the husk fraction and 49 L of brewing water, and a saccharified solution was produced in accordance with a conventional method. Wort that was filtered through a lauter tun was added with 37 kg of saccharified starch, and boiled after addition of hops. Then the wort was transferred to a settling tank where the sediments were separated and removed, and cooled to about 12° C. to give cold wort. The cold wort was then introduced into a fermentation tank, inoculated with yeast and allowed to ferment to produce happoshu having a malt use ratio of less than 25% (Prototype 6). For reference, happoshu was produced in the same manner using whole-grain malt as a starting material in place of the endothelial layer fraction and the husk fraction (Reference product 6). In both cases, the original extract was adjusted to 12 w/w % by adding water.

As a result, filtration through the lauter tun was disabled when only the endothelial layer fraction was used as a starting material, but enabled when the husk fraction was added. This suggests the activity of the husk fraction as a filtration supporting agent.

The time required for fermentation was about 240 hours for Prototype 6, in contrast with about 310 hours for Reference product 6, showing the effect of reducing the fermentation time about 70 hours.

In the happoshu in which use percentage of malt is low, nutrition sources for yeast including amino acid are particularly short. The reduction of fermentation time is attributable to increase in amino acids when the endothelial layer fraction is used as a starting material.

In the sensory evaluation, Prototype 6 was evaluated as being tastier than Reference product 6.

These results are shown in Table 7.

TABLE 7

|  | Anal. value of cold wort | | Anal. value of happoshu | |
| --- | --- | --- | --- | --- |
|  | Prototype 6 | Reference product 6 | Prototype 6 | Reference product 6 |
| Extract concentration (%) | 14.41 | 14.16 | | |
| Original extract (w/w %) | | | 12.21 | 12.18 |
| Total nitrogen (mg/100 mL) | 59.2 | 45.9 | 27.8 | 22.3 |
| Free amino nitrogen (mg/100 mL) | 14.4 | 11.2 | 3.4 | 2.8 |
| Total polyphenols (ppm) | 103 | 78 | 73 | 57 |

EXAMPLE 7

Experimental Production of Beer 4 (Use of Husk Fraction)

A production example of beer in which a husk fraction of malt having subjected to a high-temperature and high-pressure treatment in the present invention is used as a part of a starting material will be described.

To be more specific, 150 kg of malt was fractionated in the manner as described in Example 1, and 10 kg of malt husk fraction was obtained. 2 kg of this husk fraction was treated under steam of high temperature and high pressure for a minute in the condition of 200° C., 1.4 MPa, then dried in vacuo for 20 minutes to give a husk fraction having been subjected to high-temperature and high-pressure treatment. Using the husk fraction having been subjected to high-temperature and high-pressure treatment as 1% by weight of a starting material, and the whole-grain malt as the remaining 99% by weight of, beer was produced in accordance with the beer brewing method as described in Example 4 (Prototype 7).

For reference, beer using only the whole-grain malt as a starting material was produced in the same manner (Reference product 7).

These beers were evaluated for "Roasted," "Sweet," and "Fullness." Results of this sensory evaluation are shown in Table 8 below.

TABLE 8

|  | Prototype 7 | Reference product 7 |
| --- | --- | --- |
| Roasted | 2.3 | 0.2 |
| Sweet | 2.1 | 1.5 |
| Fullness | 3.4 | 2.8 |
| Taste score poor(0)-good(3) | 2.5 | 2.4 |

As shown by the result of the sensory evaluation, Prototype 7 had stronger and better flavor, taste, and color than Reference product 7 had.

Therefore, it was confirmed that by using the husk fraction having been subjected to high-temperature and high-pressure treatment as a part of a starting material, it was possible to impart aromatic flavor of ligninic phenol compound, sweet flavor, and cereal flavor to happoshu or beer. Also, by increasing the flavor component, it was possible to vary the balance of flavor in happoshu or beer, and hence to increase the thickness of flavor of happoshu or beer and enhance the body and good taste. Also it was possible to color the product, and an effect of adjusting color tone was realized.

These products would contribute largely to change in composition of happoshu or beer by the use of malt having been subjected to high-temperature and high-pressure treatment containing Maillard reaction substances which are reaction products other than lignin degradation products and increased organic acids.

It was confirmed that various characteristics can be given to a malt-based beverage also by subjecting the husk fraction to a high-temperature and high-pressure treatment.

EXAMPLE 8

Experimental Production of Beer 5 (Use of Acrospire Fraction)

In Example 2, we confirmed that use of an acrospire fraction as a starting material resulted in strong astringent taste in the resultant wort. In order to investigate whether such use influences the flavor of beer, we produced beer experimentally while adding the acrospire fraction in an amount of 10 w/w % in the starting material excluding water and hops to the endosperm fraction.

Using the endosperm fraction and the acrospire fraction fractionated in the process of Example 1, we produced beer in 100 L scale. The endosperm fraction was finely milled by a hammer mill, and a mash kettle was charged with 8.1 kg of milled endosperm fraction, 0.9 kg of non-milled acrospire fraction and 36 L of brewing water, and a mash tun was charged with 18.9 kg of milled endosperm fraction, 2.1 kg of non-milled acrospire fraction and 84 L of brewing water, and a saccharified solution was obtained in the same manner as described in Example 3. This was then filtered through a mash filter, and the obtained wort was added with hops, and boiled. Then the wort was transferred to a settling tank where the sediments were separated and removed, and then cooled to about 12° C. After adjusting the extract concentration of the cold wort at 11.2% by adding water, the cold wort was introduced into a fermentation tank, inoculated with beer yeast, and allowed to ferment to produce beer (Prototype 8). For reference, beer was produced in the same manner solely from the endosperm fraction (Reference product 8).

TABLE 9

|  | Prototype 8 | Reference product 8 |
| --- | --- | --- |
| Original extract (w/w %) | 11.16 | 11.22 |
| Total nitrogen (mg/100 mL) | 69.9 | 58.9 |
| Free amino nitrogen (mg/100 mL) | 8.9 | 6.9 |
| Total polyphenols (ppm) | 126 | 131 |
| Astringent substance (ppm) | 14.2 | 4.2 |
| Harsh taste (0-3) | 1.4 | 0.1 |

Likewise the analytical value of wort in Example 2, also in the case of beer, Prototype 8 in which the acrospire fraction was added had a smaller polyphenol content than Reference product 8 did, and contained more amino acid, protein, and astringent substance. Also in the sensory evaluation, it was confirmed that addition of the acrospire fraction increases the astringent taste significantly.

From the above, we considered that it is preferable not to use the acrospire fraction as a starting material in order to reduce the astringent taste of beer. We also considered that addition of acrospires is effective for imparting a slightly astringent taste.

EXAMPLE 9

Experimental Production of Happoshu 2 (Use of Malt Rootlets Fraction)

Using the malt rootlets fraction removed from the dry germinated barley in Example 1 as a starting material, happoshu was produced.

In brief, using malt, hops, malt rootlets fraction and water as starting materials, mashing in 200 L scale, fermentation, filtration, and packing were conducted in accordance with a conventional method to produce the objective happoshu. More specifically, 20 kg of milled malt was saccharified in a mash tun. Next, 1 kg of the malt rootlets obtained by the process of Example 1 was added without being subjected to milling, and lautered in a lauter tun. Then saccharified starch was added, and boiled and fermented in the same manner as described in Example 3 to produce happoshu (Prototype 9: containing 5 g/L of malt rootlets). For reference, happoshu to which the malt rootlets was not added was also produced in the same manner (Reference product 9).

For each of Prototype 9 and Reference product 9, evaluation in three levels (very good: 3, good: 2, bad: 1) was carried out by ten trained panelists. As a result, Prototype 9 gained 2.7 points in average, Reference product 9 gained 2.5 points in average of evaluation. Concretely, Prototype 9 was evaluated as being better than Reference product 9.

Furthermore, as to Prototype 9 and Reference product 9, total nitrogen content and amino nitrogen content of cold wort before addition of yeast were measured. As a result, in the case of Prototype 9 to which non-milled malt rootlets was added, the total nitrogen content was 72.3 mg/100 mL, the free amino nitrogen content was 16.4 mg/100 mL while in the case of Reference product 9 to which the malt rootlets was not added, the total nitrogen content was 45.7 mg/100 mL, and the amino nitrogen content was 10.2 mg/100 mL (Table 10).

In other words, it was demonstrated that in a fermented malt beverage to which the malt rootlets fraction was added in the present invention, it is possible to increase the total nitrogen content and the free amino nitrogen content which are nutrition sources for yeast.

TABLE 10

|  | Prototype 9 Cold wort | Reference product 9 Cold wort |
|---|---|---|
| Total nitrogen (mg/100 mL) | 72.3 | 45.7 |
| Free amino nitrogen (mg/100 mL) | 16.4 | 10.2 |

EXAMPLE 10

Experimental Production of Whisky (Use of Endosperm Fraction and Unseparated Fraction of Endothelial Layer Fraction, Acrospire Fraction, Husk Fraction)

In order to investigate the tissue fractions and their influence on the flavor in whisky, we produced new pots of whisky respectively using (1) only the endosperm fraction and (2) only the unseparated fraction of endothelial layer fraction, acrospire fraction, and husk fraction, and carried out evaluations.

Using the endosperm fraction fractionated in the manner as described in Example 1, whisky was produced in 20 L scale. The endosperm fraction was milled by a hammer mill, and 5 kg of the milled material and 20 L of brewing water were charged and allowed to saccharify at 65° C. for 40 minutes, and then filtered through a mash filter. The obtained wort was adjusted to have an extract concentration of 13.5% by addition of water, cooled to 23° C., inoculated with whisky yeast, and allowed to ferment, to give mash. At 67 hours following the start of the fermentation, the mash was distilled (first still) to one third of the original volume. A second still was followed that included three stages each cutting 65% of charged amount of 1.5 L to produce a new pot (Prototype 10-1). The unseparated fraction of endothelial layer fraction, acrospire fraction, and husk fraction was also processed in the same manner to produce a new pot (Prototype 10-2). These new pots each have alcohol concentration of about 72% by weight.

In the sensory evaluation of the new pots, Prototype 10-1 was mild and metallic, however, Prototype 10-2 was husky and complicated but unclean (Table 11). In this way, it was confirmed that flavor may be adjusted also in whisky by using the fractions fractionated by tissue.

TABLE 11

|  | Prototype 10-1 | Prototype 10-2 |
|---|---|---|
| Grainy | 0 | 3.0 |
| Stale | 2.5 | 0.5 |
| Smooth | 2.5 | 0 |
| Character | Mild Smooth Clean | Rough Astringent Sharp |

EXAMPLE 11

Experimental Production of Non-Alcohol Beverage (Use of Endosperm Fraction)

Among malt-based beverages, non-alcohol beverages and low-alcohol beverages in which fermentation is stopped at low alcohol concentration suffer from wort-like flavor which impairs the refreshing taste because fermentation has not proceeded sufficiently. In order to investigate whether the wort-like flavor is reduced by using the fractions fractionated by tissue, we produced a non-alcohol beverage using the endosperm fraction and made evaluation.

Cold wort was produced from the endosperm fraction in the manner as described in Example 3, and the extract concentration was adjusted to 2.1% by addition of water. As shown in Table 12, the wort had characteristics of each fraction. To this wort, sugar, acid, caramel, and flavoring agent were added to produce a non-alcohol beverage with desired flavor (Prototype 11). For reference, a non-alcohol beverage using whole-grain malt was produced in the same manner (Reference product 11). The same kinds and the same amounts of sugar, acid, caramel, and flavoring agent as added to Prototype 11 were added to Reference product 11.

Prototype 11 had less wort-like flavor and better refreshing taste than Reference product 11 did. Thus, it was confirmed that the present invention is also useful for improving flavor of non-alcohol beverage.

TABLE 12

|  | Prototype 11 Cold wort | Reference product 11 Cold wort |
|---|---|---|
| Extract concentration (%) | 2.1 | 2.1 |
| Total nitrogen (mg/100 mL) | 16.1 | 20.8 |
| Free amino nitrogen (mg/100 mL) | 3.8 | 4.7 |
| Total polyphenols (ppm) | 29 | 35 |
| Wort-like character | 2.7 | 1.2 |

INDUSTRIAL APPLICABILITY

As described above, according to the present invention it is possible to produce a malt-based beverage having variable flavor, excellent foam quality as well as excellent flavor stability and haze stability by fractionating dry germinated barley which is a main raw material for the malt-based beverage by tissue, and blending the tissue fractions appropriately based on respective characteristics of the tissue fractions.

In particular, the ability to use various tissue fractions of dry germinated barley in appropriate combination as a starting material for malt-based beverage has great industrial value because malt-based beverages having various tastes depending on particular consumer's preference can be provided.

EXPLANATION OF REFERENCE NUMERALS

Figure 1:
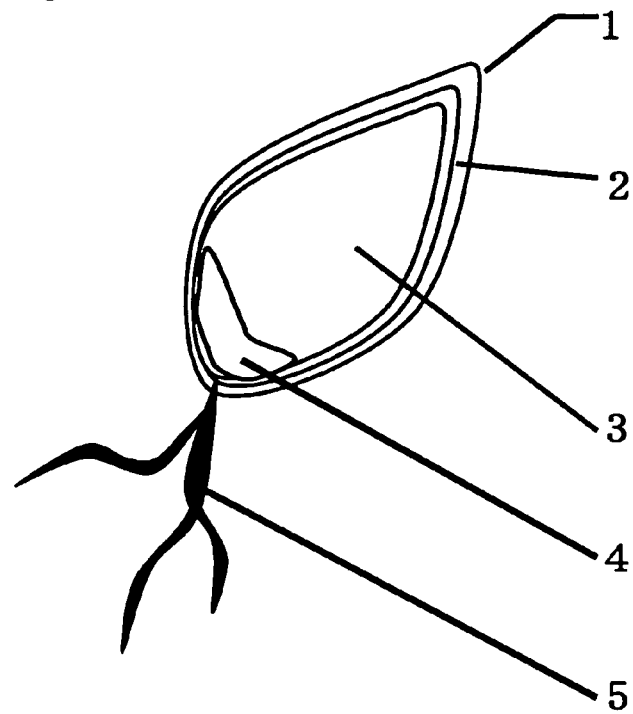
FIG. 1 A histological section of dry germinated barley used in the present invention.
Figure 2:
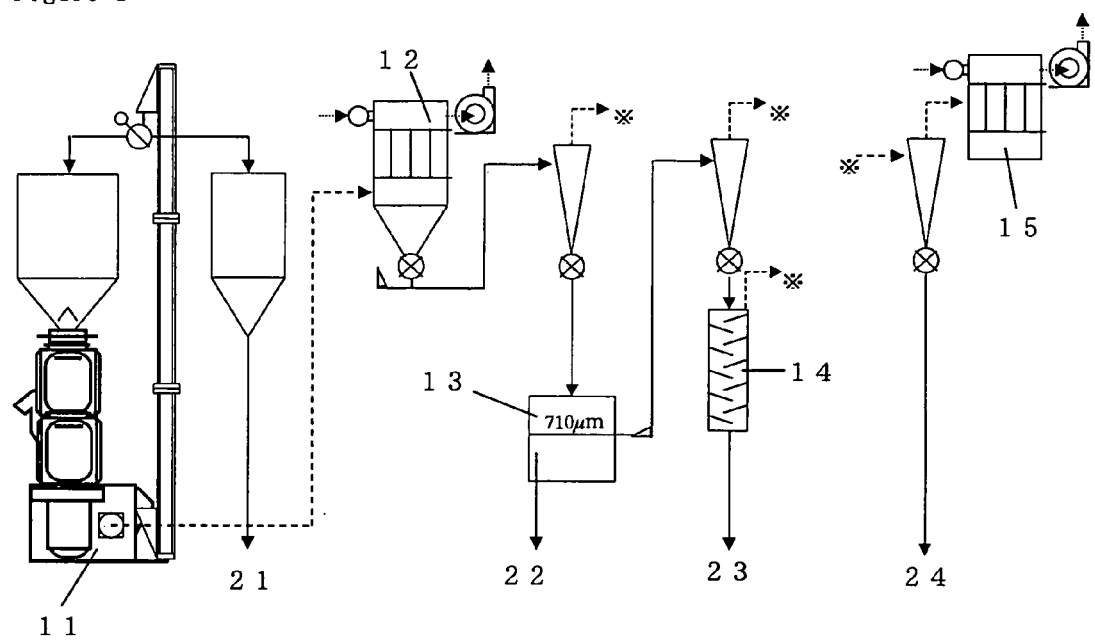
FIG. 2 A flowchart of fractionation by tissue of malt in Example 1.

1 Husk
2 Endothelial layer
3 Endosperm
4 Acrospire
5 Malt rootlets
11 Grinding machine
12 Dust collector
13 Sifter
14 Multi-aspirator
15 Dust collector
21 Endosperm fraction
22 Endothelial layer fraction
23 Acrospire fraction
24 Husk fraction

The invention claimed is:

1. A process for producing a malt-based beverage comprising barley, water and hops, comprising:
   a) grinding dry germinated barley with a yield in the range from 50 to 95% and dividing the dry germinated barley into an endosperm fraction and a bran fraction;
   b) separating the bran fraction by size and collecting the bran fraction having a particle size greater than 600 µm;
   c) separating the bran fraction having a particle size greater than 600 µm of step b) by gravity into a low-gravity section, namely, a husk fraction, and a high-gravity section, namely, an acrospire fraction; and
   d) using the husk fraction and the acrospire fraction, in combination with each other, as a starting material for the malt-based beverage, wherein the starting material comprises 0.01 to 50% by weight of the husk fraction and 2 to 30% by weight of the acrospire fraction, excluding water and hops.

2. A process for producing a malt-based beverage comprising barley, water and hops, comprising:
   a) grinding dry germinated barley through a screen network of 10-11 mesh and further dividing the ground and screened dry germinated barley into an endosperm fraction and a bran fraction;
   b) separating the bran fraction by size and collecting the bran fraction having a particle size greater than 600 µm;
   c) separating the bran fraction having a particle size greater than 600 µm of step b) by gravity into a low-gravity section, namely, a husk fraction, and a high-gravity section, namely, an acrospire fraction; and
   d) using the acrospire fraction as a starting material for the malt-based beverage, wherein the starting material comprises 2 to 30% by weight of the acrospire fraction, excluding water and hops.

3. The process according to claim 1 for obtaining a malt-based beverage in which either flavor, flavor stability, or foam quality is improved, or amino acid and various active ingredients are enhanced.

4. The process according to claim 2 for obtaining a malt-based beverage in which either flavor, flavor stability, or foam quality is improved, or amino acid and various active ingredients are enhanced.

5. A process for producing a malt-based beverage comprising barley, water and hops by controlling a component derived from dry germinated barley contained in the malt-based beverage, comprising:
   a) dividing ground dry germinated barley into an endosperm fraction and bran fraction;
   b) sifting the bran fraction through a sifter having an aperture of 710 µm creating bran of not more than 710 µm, namely, an endothelial fraction, and bran of not less than 710 µm;
   c) separating the bran of not less than 710 µm by gravity into a low-gravity section, namely, a husk fraction, and a high-gravity section, namely, an acrospire fraction; and
   d) using the acrospire fraction as a starting material for the malt-based beverage, wherein the starting material comprises 2 to 30% by weight of the acrospire fraction, excluding water and hops.

6. The process of claim 5, wherein the starting material further comprises 10 to 70% of the endothelial fraction, excluding water and hops.

* * * * *